(No Model.)

J. J. HALEY.
MANUFACTURE OF BELTING.

No. 271,630. Patented Feb. 6, 1883.

Witnesses.

G. B. Maynadier.
John R. Snow.

Inventor.

John J. Haley,
by J. E. Maynadier
his Atty.

UNITED STATES PATENT OFFICE.

JOHN J. HALEY, OF NEWTON, MASSACHUSETTS.

MANUFACTURE OF BELTING.

SPECIFICATION forming part of Letters Patent No. 271,630, dated February 6, 1883.

Application filed August 30, 1882. (No model.)

*To all whom it may concern:*

Be it known that I, JOHN J. HALEY, of Newton, in the county of Middlesex and State of Massachusetts, have invented certain Improvements in the Art or Process of Manufacturing Belting, of which the following is a specification, reference being had to the accompanying drawings, making a part hereof.

Rubber belting has long been in the market, and it has long been customary to take out the stretch from such belting after vulcanization by subjecting it to a heavy strain by means of apparatus long familiar to all skilled in this art. The patent granted to B. F. Lee, No. 26,549, of 1859, also describes rubber belting re-enforced by stitches.

The belting is made up, as usual, of plies of duck or like fabric friction-coated with rubber compound, by which I mean the pure rubber and other ingredients usually used mixed and ground into a plastic mass; but before applying the outer covering of rubber compound the plies are strongly sewed together by means of a sewing-machine and stout thread. This will be clear by reference to the drawings, in which—

Figure 1:
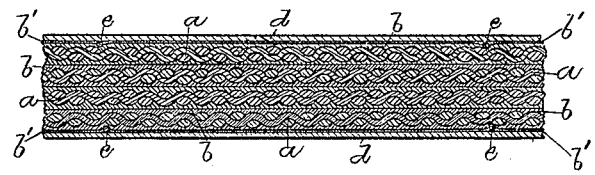
Figure 2:
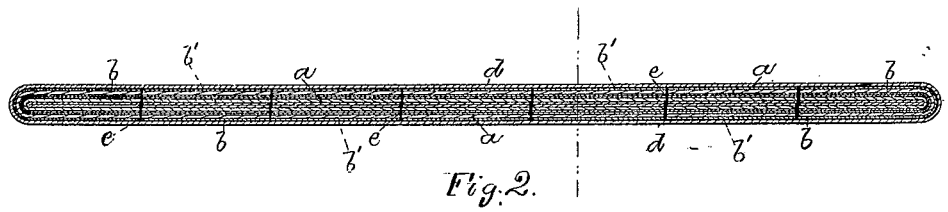
Figure 3:
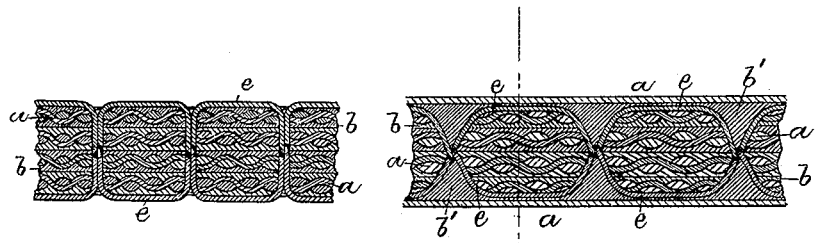

Figure 1 is a cross-section, greatly enlarged for clearness, of a piece of belting produced by my process; and Fig. 2 is a cross-section, full size, of one of the four-ply seven-inch belts. Fig. 3 is a diagram enlarged for clearness.

In the figures, $a$ represents the duck; $b$ the friction coat of rubber compound; $d$, the outer covering of rubber compound, and $e$ the threads by which the plies are sewed together.

After the belt, without its outer covering, $d$, is thus prepared, it is elongated by means of the usual apparatus, and either warm or cold, the stretch being taken out. This process somewhat diminishes the width of the belt, greatly elongates the needle-holes at both surfaces, (see Fig. 3,) tightens the threads, and so embeds them in the belt that they become nearly flush with the surfaces of the belt, while it does not in any way injure the rubber compound, as that is still plastic. The outer covering of rubber-compound, $d$, is still to be applied; but the handling of the sewed portion of the belt and the fact that uncoated threads are used in sewing it make it desirable to take certain precautions to insure that the outer coating, $d$, shall, when vulcanized, become homogeneous with the rest of the rubber in the belt. This is best accomplished by putting a friction coating, $b'$, on both surfaces of the sewed portion of the belt, and also one or more coats of rubber cement on the edges, and then applying the outer covering, $d$, with that care and skill which will be natural to all skilled in the art.

Belting thus made is not only far stronger than any other known to me of the same width and weight per square foot, but also has the stretch taken out, the duck and the threads both having been stretched under a heavy strain, while the rubber portion has as much life and elasticity as in a new unstretched belt made in the old way. The plies are also held together not only by the rubber acting as a cement and by the threads, but these threads are so strained that they are deeply bedded in the sewed portion of the belting and hold the plies in very close contact. The strain on the threads arising from the elongation of the belting is considerably more than I have been able to obtain practically from any sewing-machine, and although an inferior form of my belting might be made by sewing after stretching, yet I consider it a matter of great importance in making the best quality of belting to sew before stretching, as that causes the threads, when strained, to draw still more closely together the friction-coated plies of duck. In like manner the seams may be crosswise of the belt or in curved lines and still be within my invention; but for the best effect they must be parallel with the edges of the belt. In practice I find that making the seams one inch apart gives excellent results.

What I claim as my invention is—

That improvement in the art of making belting which consists in first coating the woven fabric with rubber compound, then making up the coated fabric in the usual way and stitching the plies together, then taking out the stretch, and then vulcanizing, as and for the purposes set forth.

JOHN J. HALEY.

Witnesses:
J. E. MAYNADIER,
J. R. SNOW.